(12) United States Patent
Hodgkins et al.

(10) Patent No.: US 6,174,438 B1
(45) Date of Patent: Jan. 16, 2001

(54) DUAL PASS FUEL FILTER ASSEMBLY AND ELEMENT THEREFOR

(75) Inventors: David H. Hodgkins, Salida; Walter H. Stone, Modesto, both of CA (US)

(73) Assignee: Parker-Hannifin Corporation, Cleveland, OH (US)

(*) Notice: Under 35 U.S.C. 154(b), the term of this patent shall be extended for 0 days.

(21) Appl. No.: 09/419,182

(22) Filed: Oct. 15, 1999

(51) Int. Cl.$^7$ .............................. B01D 27/14; B01D 35/34
(52) U.S. Cl. ...................... 210/315; 210/316; 210/342; 210/438; 210/450; 210/487; 210/497.01
(58) Field of Search ............................. 210/256, 258, 210/260, 315, 316, 342, 438, 450, 458, 487, 493.2, 497.01

(56) References Cited

U.S. PATENT DOCUMENTS

| | | |
|---|---|---|
| 1,856,771 | 5/1932 | Loeffler . |
| 2,635,759 | 4/1953 | Schwalge . |
| 2,729,339 | 1/1956 | McCoy . |
| 4,836,923 | 6/1989 | Popoff et al. . |
| 4,976,852 | 12/1990 | Janik et al. . |
| 5,017,285 | 5/1991 | Janik et al. . |
| 5,084,170 | 1/1992 | Janik et al. . |
| 5,114,575 | 5/1992 | Yano et al. . |
| 5,770,065 | 6/1998 | Popoff et al. . |
| 5,922,199 | 7/1999 | Hodgkins . |

FOREIGN PATENT DOCUMENTS

486931 * 11/1953 (IT) ...................................... 210/342

* cited by examiner

Primary Examiner—Matthew O. Savage
(74) Attorney, Agent, or Firm—Christopher H. Hunter

(57) ABSTRACT

A filter assembly includes a replaceable filter element disposed within a filter housing. The housing includes a removable cover, and a fitting including an internal central conduit extending along the central axis of the housing. The central conduit is bisected along its length and has a pair of flow channels connected to a pair of ports in the fitting. Another port is provided in the fitting and a still further port is provided in the housing. The filter element includes a first circular imperforate end cap, and a second annular imperforate end cap dimensioned to receive the central conduit. First and second filter media loops are supported between the first and second end caps. An imperforate cylindrical wall is radially disposed between the first and second filter media loops. Annular seals are provided around the opening in the second end cap, at the inner end of the first filter media loop, and at the inner end of the cylindrical wall. The seals provide a fluid seal against the central conduit when the filter element is installed in the housing to fluidly separate two flow paths through the housing.

21 Claims, 6 Drawing Sheets

DUAL PASS FUEL FILTER ASSEMBLY AND ELEMENT THEREFOR

FIELD OF THE INVENTION

The present invention relates generally to filter assemblies and filter elements therefor. Specifically, this invention relates to fuel filter assemblies and fuel filter elements for vehicles that provide enhanced filtration of fuel prior to delivery to the engine of the vehicle.

BACKGROUND OF THE INVENTION

A vehicle fuel system typically has a fuel tank for holding a supply of liquid fuel for delivery to an engine. The fuel system also includes a lift or transfer pump for pumping fuel from the tank to the engine. Some engines, particularly those that have fuel injection, also have an injection pump that raises fuel pressure beyond that produced by the lift pump so that the fuel may be injected at high pressure into the combustion chambers of the engine.

Fuel filters are known for such fuel systems to remove contaminants such as dirt and water from the fuel before it reaches the engine. Fuel filters have been used in the fuel system either at the vacuum side or the pressure side of the fuel pump. Each position for the fuel filter in relation to the lift pump has advantages and disadvantages.

One filter assembly developed by the assignee of the present invention to overcome some of these disadvantages is shown in Hodgkins, U.S. patent application Ser. No. 08/512,352 filed Aug. 8, 1995 for "Double Pass Fuel Filter Assembly", now U.S. Pat. No. 5,922,199. This assembly includes a filter cartridge with first and second filter media loops, the second media loop surrounding the first media loop, and the first filter media loop providing primary filtration for fluid flowing from a first inlet port to a first outlet port. The second filter media loop, which is fluidly separated from the first filter media loop by a cup-shaped chamber, provides secondary filtration for fluid flowing from the second inlet port to a second outlet port.

According to the Hodgkins reference, the first inlet port of the assembly is connected to receive fuel from a tank, while the first outlet port is connected to supply filtered fuel to the inlet port of a lift pump. The outlet port of the lift pump is connected to the second inlet port in the assembly to receive the filtered fuel, while the second outlet port is connected to provide highly filtered fuel to the engine. The first media loop provides primary filtration for the fuel prior to being supplied to the lift pump, while the second media loop provides secondary (enhanced) filtration prior to being supplied to the fuel injection pump in the engine. Both filter media loops are replaced when the filter element is changed.

The Hodgkins filter assembly has the advantage of providing filtration prior to fuel passing to the lift pump. This minimizes the risk that large and potentially damaging impurities will reach the lift pump. The assembly also serves to remove large impurities before they are broken up or emulsified by the pumping action of the lift pump. These large impurities are captured in the first filter media loop and are periodically drained or dumped out of the assembly when the filter element is replaced. A further advantage is that by having fuel undergo primary filtration before reaching the lift pump, the life of the fine filter media in the secondary filter media loop is prolonged. A still further advantage is that the dual filtration is provided in a single filter assembly that is relatively small and easy to mount to the fuel lines.

While the Hodgkins filter assembly has many advantages over prior filter assemblies, the Hodgkins assembly is not appropriate for all applications, as it is generally designed for a specific head structure. That is, the filter head for the Hodgkins assembly includes all four ports to receive fuel for the two fuel paths through the element. The filter element is located in a canister that is attached with a locking ring to the underside of the filter head. To replace the filter element, the fuel in the canister must be initially drained through a drain port, the locking collar for the canister removed, the canister moved downwardly away from the head, and then the filter element removed from the canister. This can be awkward and time-consuming. In addition, any fuel remaining in the head can drip onto the hands of the user or onto the engine block when the canister is removed.

As such, it is believed there is a demand in the industry for a further improved filter assembly and element that provides dual fuel paths for enhanced filtration of fuel, and which provides easy access to and replacement of the filter element for the assembly, without time-consuming steps or spillage.

SUMMARY OF THE PRESENT INVENTION

The present invention provides a novel and unique filter assembly, and filter element therefor, where the filter assembly provides dual filtration of fuel prior to delivery to an engine, and provides for easy access to and replacement of the filter element.

According to the present invention, the filter assembly includes a cylindrical canister with a threaded open end, and a cover that can be screwed onto and off of the end of the canister. A filter element is located in the canister through the open end of the canister and the cover is removably attached to the opening of the canister to enclose the element. The inlet and outlet ports to the assembly are located in the sidewall and/or lower end of the canister which allows the element to be easily replaced without spillage.

A fitting in the lower end of the canister supports a central conduit extending axially through a portion of the canister toward the open end. The central conduit is bisected along its length into two flow channels. The inner end of one of the channels is plugged, and an opening is provided into the channel through the side of the conduit. The inner end of the other channel is open. An annular channel is also provided in the fitting surrounding the central conduit.

A first inlet port and first outlet port are provided in the canister to direct fuel from the tank to the lift pump in a primary flow path through the canister. The inlet port is formed in the fitting at the lower end of the canister and directs fuel axially upward through the first channel in the conduit to the opening in the side of the conduit, where the fuel then flows radially outward, and then axially downward around and radially inward through a first (primary) media loop of the element. The fuel then flows down through the annular channel surrounding the central conduit, and then out through the first outlet port in the fitting. The first outlet port is disposed in the sidewall of the canister. The fuel is then provided to the inlet port of the lift pump.

The outlet port from the lift pump is connected to a second inlet port, formed in the sidewall of the canister. The fuel then flows radially inward through a second (secondary) media loop of the element. The filtered fuel then flows axially downward through the open end of the second channel in the central conduit to a second outlet port in the fitting, formed in the lower end of the canister. The fuel is then provided to the combustion chamber of the engine.

The filter element for the assembly includes first and second imperforate end caps, with the second end cap having a central circular opening dimensioned to receive the conduit and fitting of the housing. An annular seal or gasket bounds the opening to seal against the fitting. The second filter media loop is provided in surrounding relation to the first media loop, and extends between and is adhesively bonded to the first and second end caps.

The first media loop is attached at a first end to the second end cap (bounding the central opening) and extends axially inward toward the first end cap. The inner end of the first media loop defines an opening which receives the central conduit, and includes an annular seal or gasket to seal against a first location the conduit.

An imperforate cylindrical wall is disposed radially between the first and second media loops. The cylindrical wall includes a first end integral with the second end cap (also bounding the central opening), and extends axially inward toward the first end cap. The inner end of the cylindrical wall also defines an opening which receives the central conduit, and includes an annular gasket or seal to seal against another location along the conduit.

The gaskets/seals of the second end cap, first filter media loop and cylindrical wall, are co-axially arranged, with the annular gasket/seal for the first filter media loop axially disposed between the annular gasket/seal for the second end cap and the annular gasket/seal of the cylindrical wall. The gaskets/seals for the cylindrical wall and the first filter media loop are axially arranged on either side of the opening in the side of the central conduit.

When the filter element is installed within the housing, a first fuel flow path is provided from the tank through the first inlet port in the fitting, through the one channel in the central conduit, out through the opening in the side of the conduit, through the first filter media loop, through the annular channel in the fitting surrounding the central conduit, and out through the first outlet port to the lift pump. The first flow path provides primary fuel filtering from the tank to the lift pump.

A second flow path is also provided from the lift pump, through the second inlet port in the sidewall of the housing, radially inward through the second filter media loop, through the other channel in the central conduit, and out through the second outlet port in the fitting to the engine. The second flow path provides secondary (enhanced) fuel filtering from the lift pump to the engine. The cylindrical wall and gaskets/seals fluidly separate the fuel in the first flow path from the fuel in the second flow path.

The filter element with first and second filter media loops can be easily inserted into and removed from the filter housing when spent and replaced with a fresh element. The end cap on the canister is merely unscrewed and the element is removed through the open end of the canister. It is not necessary to drain the fuel in the assembly, as the fuel remains contained within the canister.

The fuel filter assembly of the present invention thereby effectively filters two separate fuel paths in the fuel system for enhanced filtration, while providing easy access to and replacement of the filter element.

Further features and advantages of the present invention will become apparent to those skilled in the art upon reviewing the following specification and attached drawings.

DETAILED DESCRIPTION OF THE PREFERRED EMBODIMENT

Figure 1:
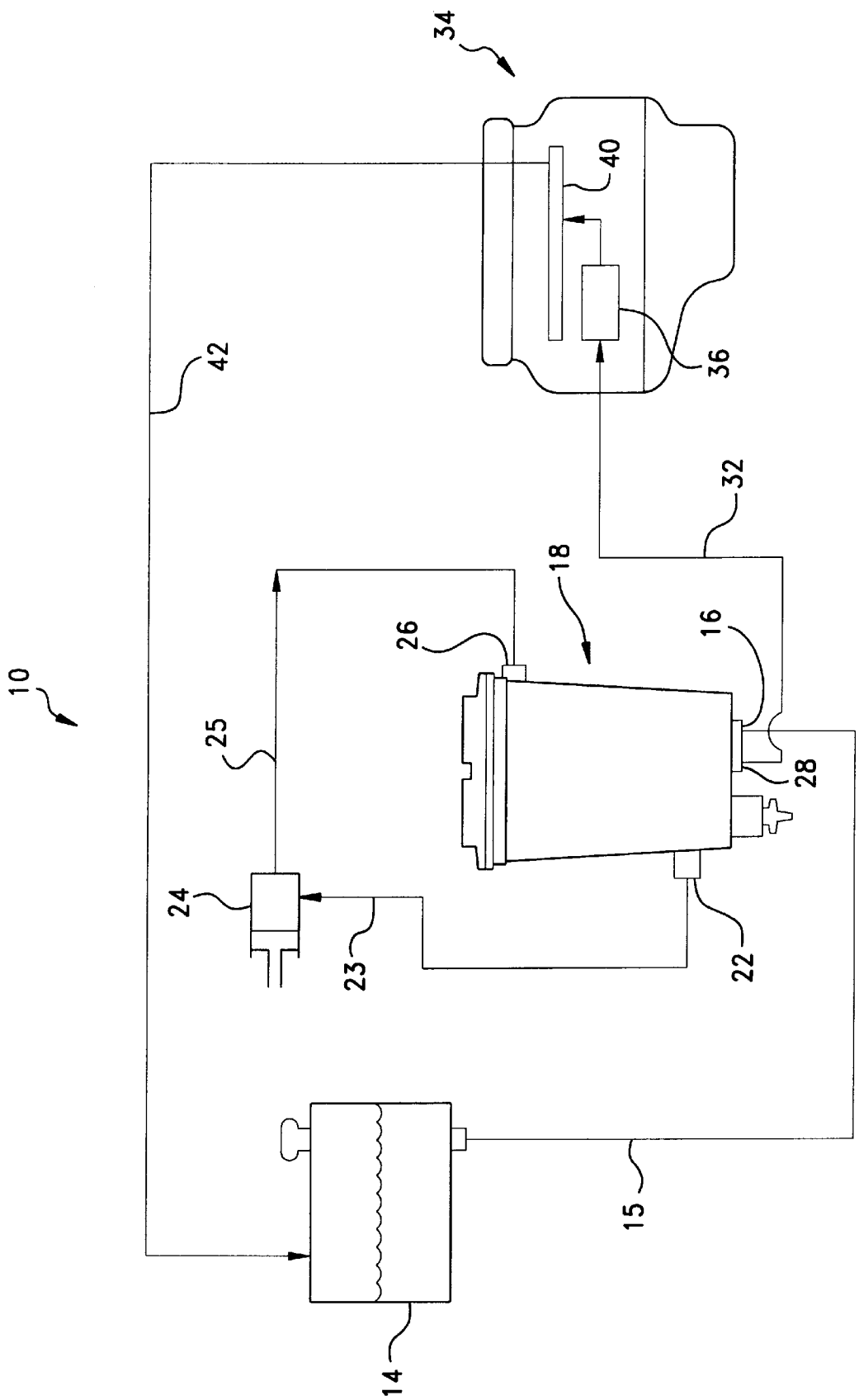
FIG. 1 is a schematic illustration of a vehicle fuel system including a fuel filter assembly of the present invention.

Referring to the drawings, and initially to FIG. 1, a fuel system for a vehicle is indicated generally at 10. Fuel is delivered from a fuel tank 14 along conduit 15 into a first inlet port 16 in a fuel filter assembly, indicated generally at 18, constructed according to the principles of the present invention. The filtered fuel then leaves the filter assembly 18 through a first outlet port 22, and is directed through conduit 23 to a lift or transfer pump 24.

The fuel from the pump 24 is then returned along conduit 25 to a second inlet port 26 in the fuel filter assembly. The fuel is again filtered in fuel filter assembly and leaves the fuel filter assembly through second outlet port 28.

The fuel is then provided along conduit 32 to an engine, indicated generally at 34, and typically directly to a fuel injection pump 36 in the engine. The fuel injection pump 36 feeds fuel at elevated pressure to a fuel rail 40 in a conventional manner for delivery to fuel injectors which deliver the fuel to the cylinders of the engine. A return line 42 returns excess fuel from the fuel rail to the tank 14.

The fuel filter assembly 18 will now be described in more detail. Referring now to FIGS. 2 through 6, the fuel filter assembly 18 includes an outer canister or housing 50 having a cylindrical sidewall 51 with an integral (one-piece) closed end 52 and an open end 54. A filter element, indicated generally at 56, can be inserted into and removed from housing 50 through open end 54. A cover 57 encloses the filter element within the housing.

Housing 50 has a fitting 60 at the closed end 52 that includes first inlet port 16, first outlet port 22, and second outlet port 28. Ports 22 and 28 are preferably formed in the end wall 52, while port 26 is formed along the canister sidewall, toward closed end 52. Either (or both) of ports 16, 28 could likewise be provided in sidewall 51, while port 22 could likewise be provided in end wall 52. Second inlet port 26 is preferably formed along sidewall 51 toward open end 54, although this port could likewise be provided in end wall 52, or in sidewall 51 closer to end wall 52. It is merely preferred that ports 16, 22, 26 and 28 be formed at some location along housing 50, rather than in cover 57. In any case, ports 16, 22, 26 and 28 are threaded to allow easy connection to the fuel conduits in the fuel system.

Fitting 60 terminates internally of housing 50 in an annular open end 64, and includes a radially-reduced cylindrical portion 66, a radially-enlarged cylindrical portion 68, and an annular shoulder 69 interconnecting the radially-reduced portion 66 and radially-enlarged portion 68.

Figure 3:
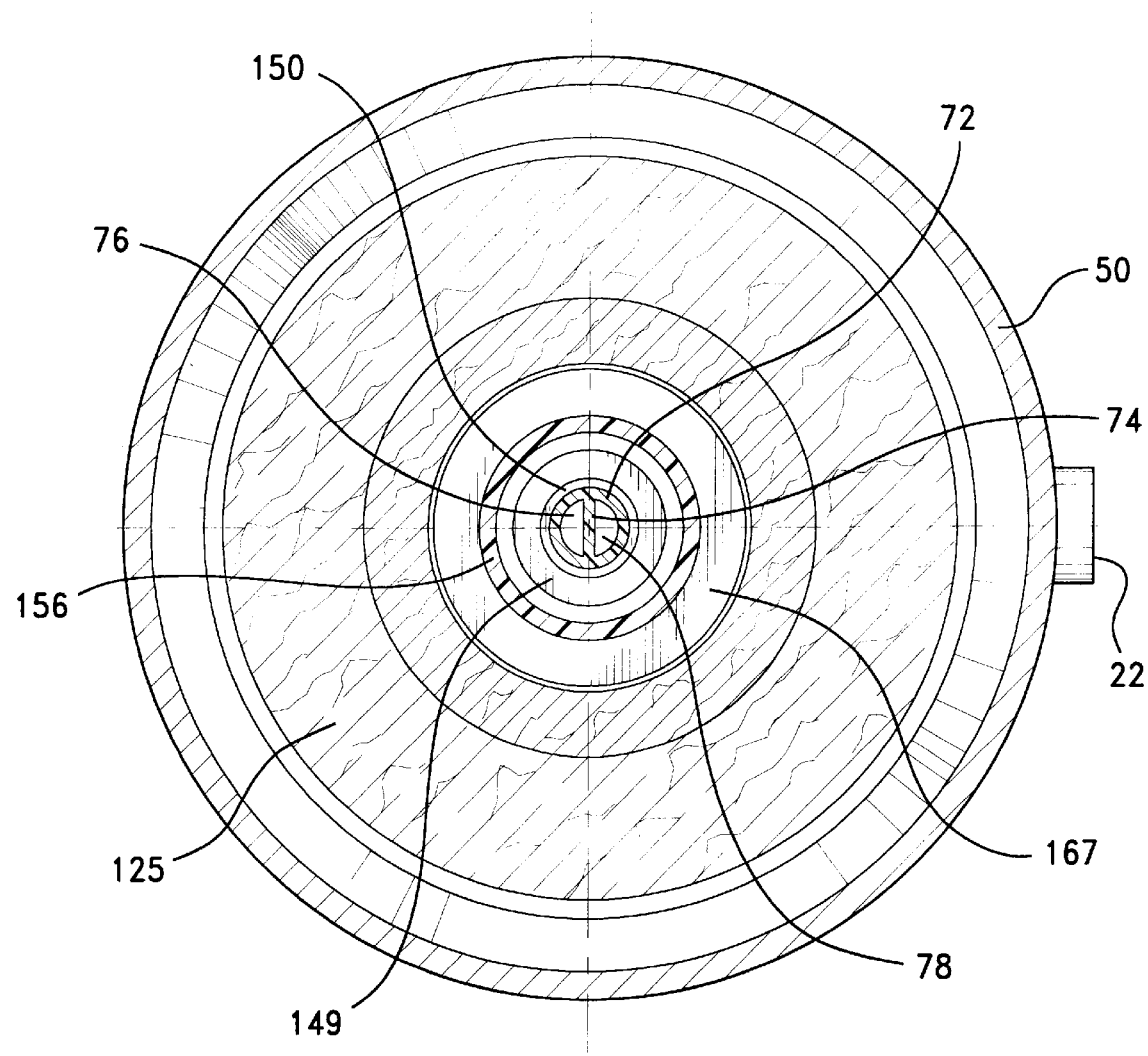
FIG. 3 is a cross-sectional end view of the fuel filter assembly taken substantially along the plane described by the lines 3—3 of FIG. 2.
Figure 4:
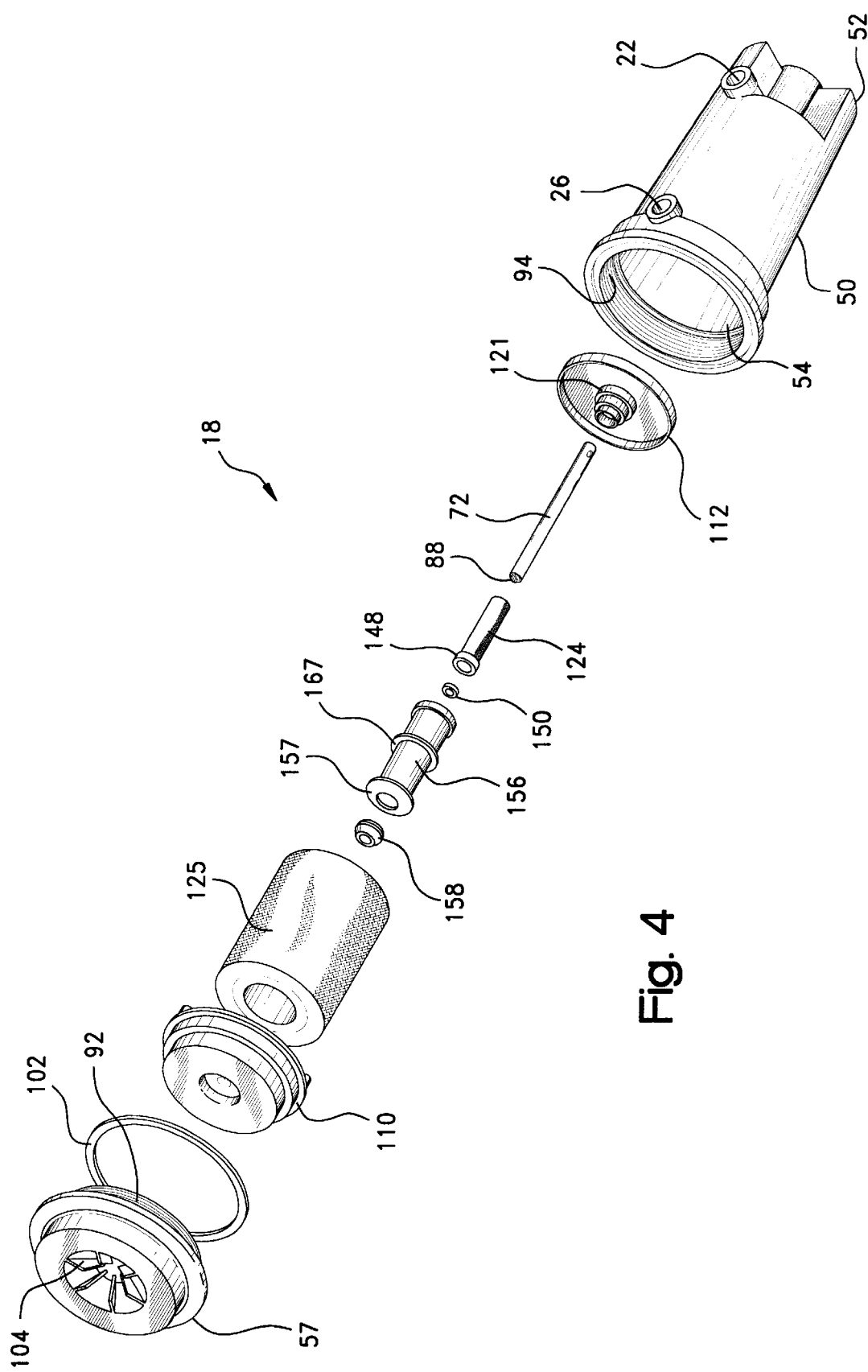
FIG. 4 is an exploded view of the fuel filter assembly.

A central cylindrical conduit 72 extends along the central axis of the canister and is supported at one end by fitting 60. As shown in FIG. 3, conduit 72 includes an internal wall 74 bisecting the conduit along its length. Wall 74 defines a first flow channel 76 and a separate, second flow channel 78, both of which extend axially along the length of the conduit.

Channel 78 is blocked (fluidly closed) at the inner distal end of the conduit 72 by a semi-circular plug 88. An opening 90 is provided, spaced from the distal end of conduit 72, to allow flow out of (or into) channel 78. Channel 76 is open at the inner distal end of the conduit.

Figure 6:
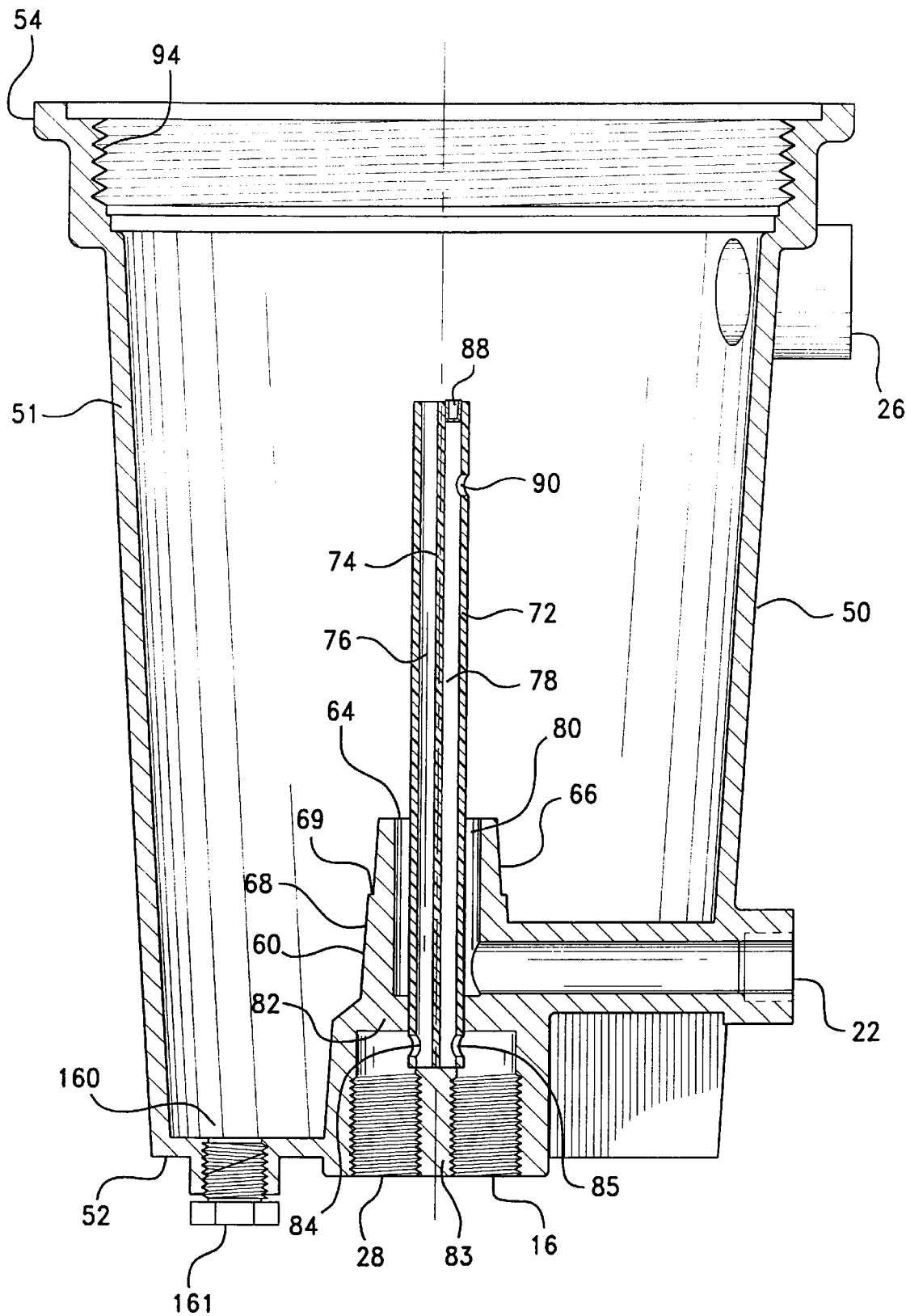
FIG. 6 is a cross-sectional side view of the housing and associated components of the fuel filter assembly.

Referring now to FIG. 6, conduit 72 is received in a central bore 80 of fitting 60, and is closely (press-fit) and sealingly held within an opening in an internal wall 82. The outer end of the conduit 72 butts up against a post 83 in the fitting, and includes passages 84, 85 which fluidly connect first flow channel 76 with second outlet port 28; and second flow channel 78 with first inlet port 16, respectively. The inner end of the conduit 72 extends axially forward the open end of the canister.

The upper portion of the fitting 60 extending axially upward from wall 82, is radially outwardly-spaced from conduit 72, and defines an annular channel or gap around the conduit. The channel is in fluid communication with first outlet port 22.

Figure 2:
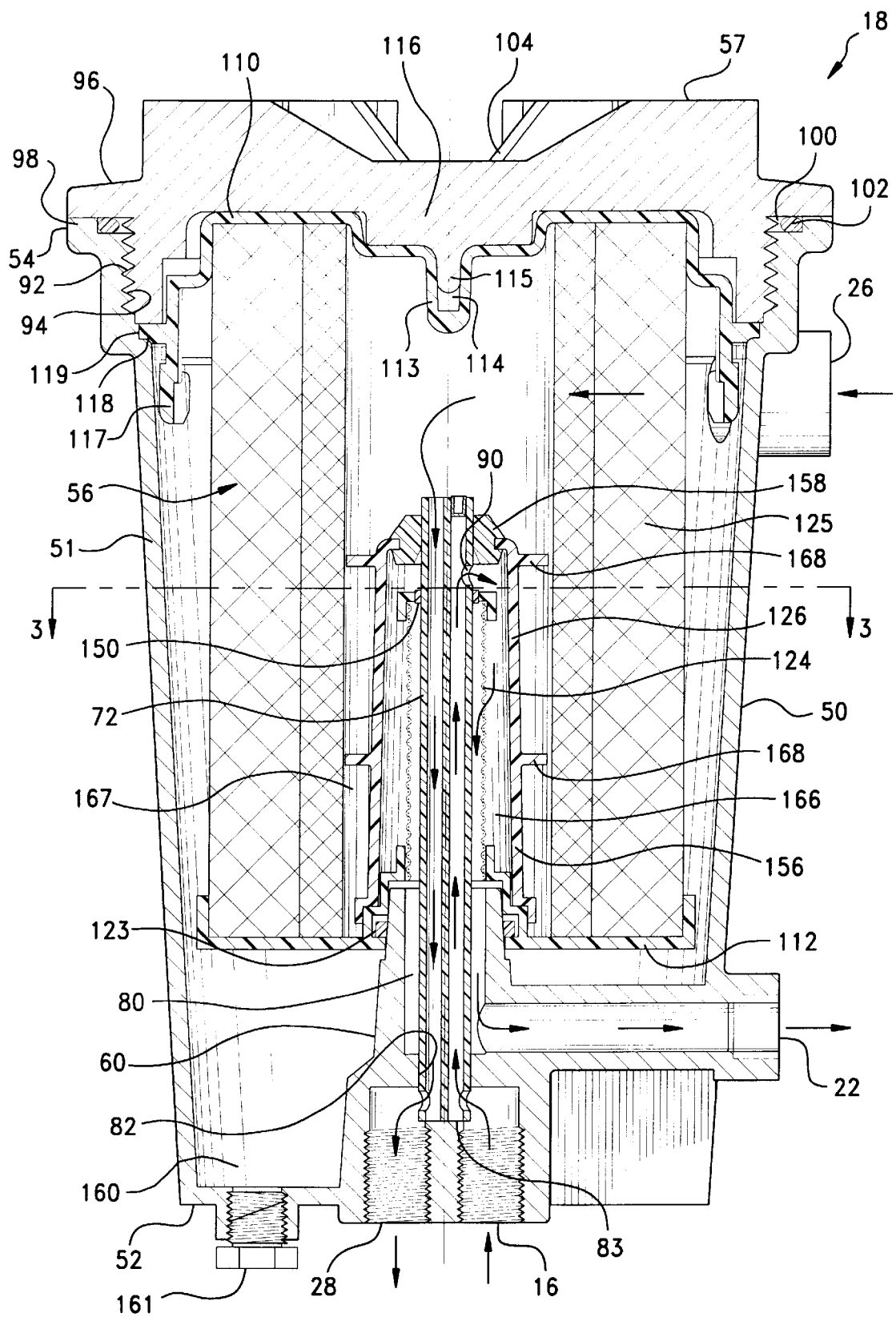
FIG. 2 is a cross-sectional side view of the fuel filter assembly of FIG. 1.

As shown in FIG. 2, the cover 57 for the housing includes an outwardly-threaded portion 92 that is adapted to engage inwardly-threaded portion 94 adjacent the opening of housing 50. Cover 57 further includes a radially-extending flanged portion 96 which is adapted for engaging a lip portion 98 of the canister. Lip portion 98 includes a circumferentially-extending recess 100 for receiving a resilient seal 102. Seal 102 holds the cover in fluid-tight relation with the canister when the cover is installed (screwed) thereon. Cover 50 also includes outwardly-extending wing projections 104 which facilitate manually holding and screwing or unscrewing the cover on the housing.

The housing 50 and cover 57 are preferably formed from conventional materials (e.g., aluminum, hard-plastic), using conventional techniques. These should be well-known to those skilled in the art and will not be described further for sake of brevity.

Figure 5:
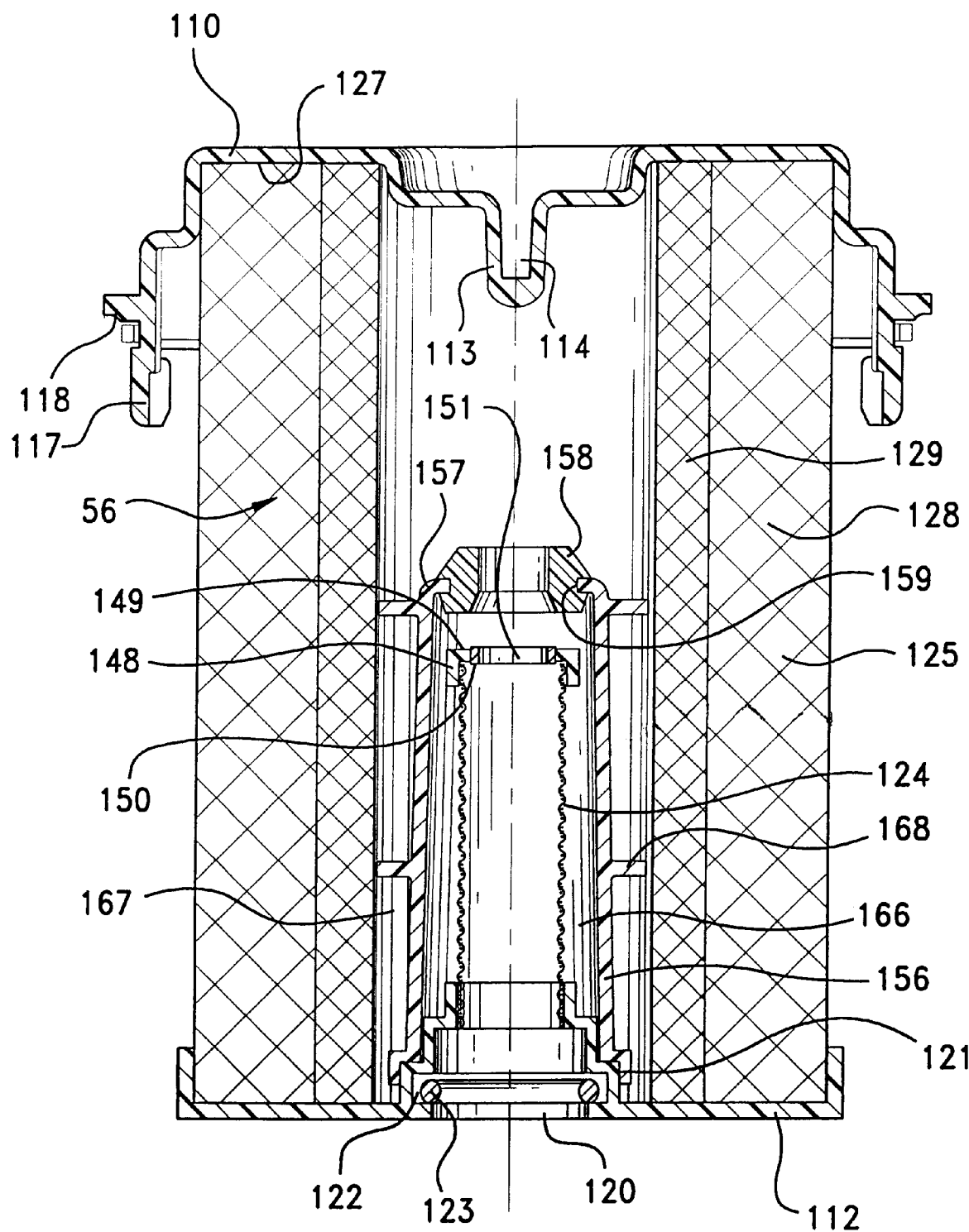
FIG. 5 is a cross-sectional side view of the filter element for the fuel filter assembly of FIG. 2.

Referring now to FIG. 5, the filter element 51 for the assembly includes a first (upper) circular imperforate end cap 110 and a second (lower) annular imperforate end cap 112. First end cap 110 includes an integral projection 113 with an overlying, outwardly-facing recess 114. Recess 114 accepts a cover projection 115 (FIG. 2) therein which projects inwardly from a centering projection 116 on cover 57. The first end cap 110 is preferably formed in one piece from appropriate materials (e.g., aluminum or plastic).

First end cap 110 further includes a pair of oppositely-spaced latching fingers 117. Latching fingers each have a locking portion 118 which is received in openings 119 in the threaded portion 92 of cover 50 (FIG. 2). Such latching fingers and cooperating openings allow the filter element to be removed from the housing, and easily separated from cover 50 to minimize contact within a fluid in the housing. A further description of the means for latching the filter element to the cover is provided in U.S. Pat. No. 5,770,065, which to the extent necessary is incorporated herein by reference.

The second annular end cap 112 defines a first central circular opening 120. A cylindrical portion 121 provided integral (preferably unitary in one-piece) with the second end cap surrounding the central opening 120 and extends axially inward in a radially-decreasing step-wise fashion. A radially-inward facing groove or channel 122 adjacent opening 120 is defined by the cylindrical portion 121 and an annular portion of the second end cap 112 bounding opening 120. An annular resilient sealing element 123 (FIG. 2) is received in channel 122 and is dimensioned to closely receive and seal against the inner portion 66 of fitting 64. Second end cap 112 is likewise preferably formed in one piece from appropriate materials (e.g., aluminum or plastic).

The filter element 51 includes a first filter media loop 124, and a second filter media loop 125, surrounding and co-axial with the first filter media loop 124. Second filter media loop 125 is received within an annular recess 127 formed in the first end cap 110, and is sealingly bonded to the inner surface of the first end cap in an appropriate manner, such as with adhesive. The second filter media loop 125 is likewise sealingly bonded to the inner surface of the second end cap 112. The second filter media loop 125 is preferably formed from a pleated filter media, but can be formed from any type of media in any type of configuration appropriate for the particular application. The second filter media loop is illustrated as including a radially-outward disposed first media loop portion 128, and a radially-inward disposed second media portion 129 which can be formed of the same or different medial media in the same or different configuration as the first media loop portion 128, although it is to be noted that the second filter media loop could likewise be formed with only a single media loop portion.

The first filter media loop 124 is provided radially inward of the second filter media loop 125. First filter media loop 124 preferably comprises a mesh or steel screen, or other appropriate media material for the particular application. First filter media loop 124 includes an outer (lower) end supported by the inner distal end of the cylindrical portion 121. The loop can be fixed to the cylindrical portion 121 in an appropriate manner, such as with adhesive. The first filter media loop 124 extends inward (upward) toward first end cap 110. A cylindrical flange 148 is attached to the inner end of the loop, such as with adhesive. Cylindrical flange 148 includes a radially-in-turned portion 149 which defines a second circular opening 151, co-axial with the first opening 120. An annular resilient sealing element 150 is supported by in-turned portion 149 and projects radially-inward toward the central axis of the filter element. Second sealing element 150 is designed to seal against the central conduit 72 when the filter element is installed in housing 50 (see FIG. 2).

A cylindrical imperforate wall 156 is disposed radially between first filter media loop 124 and second filter media loop 125. Cylindrical wall 156 has an outer (lower) end supported by the cylindrical portion 121 of the second end cap 112 (surrounding opening 120), and fluidly-sealed thereto such as with adhesive. Wall 156 extends inward (upward) toward the first end cap 110. The inner end of the annular wall includes a radially in-turned annular flange 157 which defines a third circular opening 159, co-axial with the first and second openings. An annular resilient sealing element 158 is supported by the annular flange 157, and projects radially inward toward the central axis of the filter element. Third seal 158 is also dimensioned to seal against conduit 72 when the filter element is installed in housing 50 (see FIG. 2), at a location axially-spaced from second seal 150, and on an opposite axial side of opening 90 in conduit 72.

An annular flow gap 166 is provided between cylindrical wall 126 and second filter media loop 125. Likewise, an annular flow gap 167 is provided between cylindrical wall 156 and first filter media loop 124. A series of radially-projecting standoffs 168 are provided to ensure that gap 167 is maintained along substantially the entire length of wall 156.

As can be seen in FIG. 2, seals 123, 150 and 158 are co-axially arranged to provide fluid-tight seals along fitting 50 and central conduit 72 when the filter element is installed within the housing. Seal 123 is radially-outward spaced from seals 150 and 158 to properly seal to the radially-larger fitting. Seal 150 and seal 158 are axially disposed relative to each other and project radially-inward to a common cylindrical projection to properly seal on opposite sides of opening 90 in conduit 72.

When filter element 51 is received within housing 50, the central conduit 72 is received through the first opening 120 in the second end cap 112, through the second opening in the first filter media loop 124, and through the third opening in the cylindrical wall 156. Seal 123 on the second end cap 112 seals to fitting 64, while seals 150 and 158 seal axially along the conduit 72, on opposite sides of opening 90. Second end cap 112 receives the reduced diameter portion 66 of fitting 64 and the stepped-portion of cylindrical portion 121 abuts the inner end 64 of the fitting to locate the element within the housing. Alternatively, or in addition, the portion of the end cap 112 can abut the annular shoulder 69 of the fitting 66 to locate the element.

As can be seen in FIG. 2, a first flow path is provided through first inlet port 16, axially (upward) through channel 78 of conduit 72, radially-outward through opening 90, axially (downward) in the annular flow gap 166 between first filter media loop 124 and cylindrical wall 156, and then radially-inward through first filter media loop 124. The fuel is initially filtered through this flow path, removing harmful contaminants (or at least contaminants harmful to the lift or transfer pump). The fuel then flows axially (downward) between first filter media loop 124 and conduit 72, through bore 80 (in the annular channel between fitting 60 and conduit 72) and through first outlet port 22 to the lift or transfer pump. Thus, a primary flow path is provided through the filter assembly from the tank to the lift pump.

A second flow path is provided from the outlet of the lift pump, through second inlet port 26, radially-inward through second filter media loop 125 to the inner end of channel 76 in conduit 72. The flow then passes axially (downward) through channel 76, and then out through second outlet port 28 to the engine. Thus, a secondary flow path is provided through the filter assembly from the lift pump to the engine, for enhanced filtration. It is noted that seals 138, 150 and 158 and cylindrical wall 156, fluidly-separate the first and second flow paths through the filter assembly.

As also shown in FIG. 2, the housing includes a lower collection zone 160, and a drain valve 161 in lower end wall 52, such that contaminants collecting on outer filter media loop 125 can fall downwardly into zone 160, and be removed through drain 161. Such drain valves are well known to those in the art (see, e.g., U.S. Pat. Nos. 4,314,689 and 4,502,455). Element 56 can of course be replaced when spent merely by unscrewing cover 57, removing the spent element and replacing the spent element with a fresh element.

While it is preferred that the first filter media loop 124 be used as the filter for the primary flow path from the tank to the lift pump, and the second filter media loop 125 be used as the filter for the secondary flow path from the lift pump to the engine, it is possible that the connection to ports 16, 22, 26, 28 could be switched, with the first filter media loop providing secondary filtration for the engine and the second filter media loop providing primary filtration for the lift pump. The present invention is not intended to be limited to the specific examples given.

Thus, as described above, the present invention provides a new and unique fuel filter assembly, and filter element therefor, that provides dual filtration for fuel prior to delivery to an engine. The fuel filter assembly has the advantage of providing filtration prior to fuel passing to the lift pump, and enhanced filtration of fuel passing to the engine. The element can be easily removed from the housing when spent, without time-consuming steps or spillage.

The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the scope and spirit of the invention as set forth in the appended claims.

What is claimed is:

1. A filter element, comprising:
   a circular imperforate first end cap;
   a second end cap having an annular imperforate portion defining a first circular opening;
   a second filter media loop circumscribing a central axis and disposed between said first and second end caps, said second filter media loop having a first end adhesively bonded to the first end cap, and a second end adhesively bonded to the second end cap;
   a first filter media loop circumscribing the central axis disposed radially inward of and surrounded by said second filter media loop, said first filter media loop having a first end supported by the second end cap and surrounding the first opening in the second end cap, and a second end extending axially toward the first end cap to a second circular opening, co-axial with the first circular opening;
   an imperforate cylindrical wall disposed radially between said first and second filter media loops, said cylindrical wall supported by the second end cap and surrounding the first opening in the second end cap, and extending inward toward the first end cap to a third circular opening co-axial with the first and second circular openings.

2. The filter element as in claim 1, further including a third resilient annular sealing element bounding said third circular opening in said cylindrical wall, and projecting radially inward toward said central axis.

3. The filter element as in claim 2, wherein said cylindrical wall has a radially in-turned annular flange at an inner end of the end wall supporting the third sealing element.

4. The filter element as in claim 2, further including a first resilient annular sealing element bounding said first circular opening in said second end cap, and projecting radially inward toward said central axis.

5. The filter element as in claim 4, further including a second resilient annular sealing element bounding said second circular opening in said first filter media loop, and projecting radially inward toward said central axis.

6. The filter element as in claim 5, wherein said second sealing element is disposed axially between said first and third sealing elements.

7. The filter element as in claim 6, wherein said second and third sealing elements project radially-inward to a common cylindrical projection.

8. The filter element as in claim 7, wherein said first sealing element is radially outward disposed from said second and third sealing elements.

9. The filter element as in claim 1, wherein an annular flow gap is provided between said cylindrical wall and said second filter media loop.

10. The filter element as in claim 9, wherein another annular flow gap is provided between said cylindrical wall and said first filter media loop.

11. A filter element positionable within a filter housing having an internal fitting at a closed end of the housing and a central cylindrical conduit extending axially from the fitting toward an open end of the housing, said filter element comprising:

a circular imperforate first end cap;

a second end cap having an annular imperforate portion defining a first circular opening dimensioned to receive the central conduit, and a resilient annular sealing element bounding the first opening to seal against the fitting when the cylindrical conduit is received in the first circular opening;

a second filter media loop circumscribing a central axis and disposed between said first and second end caps, said second filter media loop having a first end adhesively bonded to the first end cap, and a second end adhesively bonded to the second end cap;

a first filter media loop circumscribing the central axis and disposed radially inward of and surrounded by said second filter media loop, said first filter media loop having a first end supported by the second end cap and surrounding the first opening in the second end cap, and a second end extending axially toward the first end cap to a second circular opening, co-axial with the first circular opening, and a second resilient annular sealing member bounding the second circular opening to seal against the cylindrical conduit when received in the second circular opening; and an imperforate cylindrical wall disposed radially between said first and second filter media loops, said cylindrical wall supported by the second end cap and surrounding the first opening in the second end cap, and extending axially toward the first end cap to a third circular opening, co-axial with the first and second circular openings, and a third resilient annular sealing member bounding the third circular opening to seal against the cylindrical conduit when received in the third circular opening, the second sealing member being axially spaced between the first and second sealing members.

12. The filter element as in claim 11, wherein an annular flow gap is provided between said cylindrical wall and said second filter media loop.

13. The filter element as in claim 12, wherein another annular flow gap is provided between said cylindrical wall and said first filter media loop.

14. The filter element as in claim 11, wherein said second and third sealing elements project radially-inward to a common cylindrical projection.

15. The filter element as in claim 14, wherein said first sealing element is radially outward disposed from said second and third sealing elements.

16. A filter assembly, including a filter element disposed within a filter housing, said filter housing having a fitting at a closed end of the housing and an internal central cylindrical conduit extending axially from the fitting toward an open end of the housing, said central cylindrical conduit including a pair of flow channels fluidly connected to first and second ports in the fitting, with one of the flow channels having an opening in the inner end of the conduit, and the other of the flow channels having an opening along the length of the conduit, an annular flow passage provided between the fitting and the central conduit to a third port in the housing, and another flow passage provided from a fourth port in the housing, said filter element having:

a first end cap having a circular imperforate portion, a second end cap having an annular imperforate portion defining a first circular opening receiving the central conduit, and a resilient sealing element bounding the first opening and sealing against the fitting, a second filter media loop circumscribing a central axis and disposed between said second and second end caps, said second filter media loop having a first end adhesively bonded to the first end cap, and a second end adhesively bonded to the second end cap;

a first filter media loop circumscribing the central axis and disposed radially inward of and surrounded by said second filter media loop, said first filter media loop having a first end supported by the second end cap and surrounding the first opening in the second end cap, and a second end extending axially toward the first end cap to a second circular opening, co-axial with the first circular opening, and a second resilient sealing member bounding the second circular opening sealing against the cylindrical conduit, and a first flow path provided from the first port, through the other flow channel in the central conduit, through the first media loop, through the annular flow passage between the fitting and the central conduit to the third port; and an imperforate cylindrical wall disposed radially between said first and second filter media loops, said cylindrical wall supported by the second end cap and surrounding the first opening in the second end cap, and extending axially toward the first end cap to a third circular opening receiving the cylindrical conduit, and a third resilient sealing member bounding the third circular opening and sealing against the cylindrical conduit, and a second flow path, separate from said first flow path, from the fourth port, through the second filter media loop, through the one flow channel in the central conduit to the second port.

17. The filter assembly as in claim 16, wherein said housing includes a generally cylindrical sidewall, and a cover removably attached to the open end of the sidewall allowing access to the filter element.

18. The filter assembly as in claim 16, wherein a first annular flow gap is provided between said cylindrical wall and said second filter media loop.

19. The filter assembly as in claim 18, wherein a second annular flow gap is provided between said cylindrical wall and said first filter media loop.

20. The filter assembly as in claim 16, wherein said second and third sealing elements project radially-inward to a common cylindrical projection.

21. The filter assembly as in claim 20 wherein said first sealing element is radially outward disposed from said second and third sealing elements.

* * * * *